(12) United States Patent
Kawamura et al.

(10) Patent No.: US 11,672,724 B2
(45) Date of Patent: Jun. 13, 2023

(54) INFORMATION PROCESSING DEVICE AND INFORMATION PROCESSING METHOD

(71) Applicant: TOYOTA JIDOSHA KABUSHIKI KAISHA, Aichi-ken (JP)

(72) Inventors: Hiroaki Kawamura, Toyota (JP); Kohei Shintani, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/530,476

(22) Filed: Nov. 19, 2021

(65) Prior Publication Data

US 2022/0233392 A1 Jul. 28, 2022

(30) Foreign Application Priority Data

Jan. 22, 2021 (JP) .............................. JP2021-008918

(51) Int. Cl.
| | |
|---|---|
| *A61H 3/06* | (2006.01) |
| *G06V 40/10* | (2022.01) |
| *G06V 10/20* | (2022.01) |
| *G06V 40/20* | (2022.01) |
| *G06F 18/22* | (2023.01) |
| *G06F 18/00* | (2023.01) |
| *G06F 18/2321* | (2023.01) |
| *G09B 21/00* | (2006.01) |

(52) U.S. Cl.
CPC .............. *A61H 3/061* (2013.01); *G06F 18/00* (2023.01); *G06F 18/22* (2023.01); *G06F 18/2321* (2023.01); *G06V 10/255* (2022.01); *G06V 40/103* (2022.01); *G06V 40/25* (2022.01); *G09B 21/007* (2013.01)

(58) Field of Classification Search
None
See application file for complete search history.

(56) References Cited

U.S. PATENT DOCUMENTS

| | | | |
|---|---|---|---|
| 11,205,082 B2* | 12/2021 | Adeli-Mosabbeb ... | G06V 20/58 |
| 2012/0237086 A1* | 9/2012 | Kourogi ................. | G01S 11/12 |
| | | | 382/103 |
| 2017/0337432 A1 | 11/2017 | Maeda et al. | |
| 2019/0307632 A1* | 10/2019 | Yashiro .................... | A61F 9/08 |
| 2020/0307563 A1* | 10/2020 | Ghafarianzadeh ..... | G06V 20/58 |
| 2021/0300359 A1* | 9/2021 | McGill .................... | G06T 7/77 |

FOREIGN PATENT DOCUMENTS

| | | |
|---|---|---|
| JP | 201388856 A | 5/2013 |
| JP | 201720303 A | 1/2017 |
| JP | 2017207973 A | 11/2017 |
| WO | 2018025531 A1 | 2/2018 |

\* cited by examiner

*Primary Examiner* — Thomas S McCormack
(74) *Attorney, Agent, or Firm* — Hauptman Ham, LLP

(57) ABSTRACT

An information processing device calculates an occupancy rate of a pedestrian crossing in an image obtained by capturing an image of a traveling direction of a target person, determines a crossing status of the target person for the pedestrian crossing based on the calculated occupancy rate, and generates support information for supporting the target person crossing the pedestrian crossing based on the crossing status.

11 Claims, 11 Drawing Sheets

INFORMATION PROCESSING DEVICE AND INFORMATION PROCESSING METHOD

CROSS-REFERENCE TO RELATED APPLICATION

This application claims priority to Japanese Patent Application No. 2021-008918 filed on Jan. 22, 2021, incorporated herein by reference in its entirety.

BACKGROUND

1. Technical Field

The present disclosure relates to an information processing device and an information processing method.

2. Description of Related Art

Visually impaired people who do not use their vision travel relying on contact information when the white cane they carry comes into contact with a road surface or obstacle as well as sounds from their surroundings. For example, when crossing a pedestrian crossing, they can recognize the correct direction of travel, relying on the information of contact with tactile pavings provided along the sidewalk at the pedestrian crossing and the sound of acoustic signals.

However, some pedestrian crossings are not provided with tactile pavings or acoustic signals. In such a case, the information obtained from the surroundings is insufficient, and the visually impaired people may deviate from the pedestrian crossing without knowing the correct direction of travel.

Here, WO 2018/025531 discloses an information processing device that recognizes pedestrian crossings on a route to a destination in advance and guides a walking direction when a visually impaired person arrives at the pedestrian crossing. This information processing device captures an image of the direction of crossing from a position in front of the pedestrian crossing on the route in advance, and stores the captured still image and position information acquired by the Global Positioning System (GPS) sensor. Then, when the visually impaired person crosses the pedestrian crossing for the second time and onward, the information processing device performs matching processing of a still image captured during walking based on the stored (registered) still image of the direction of crossing, to calculate the deviation of the direction, thereby providing guidance on the direction to walk. As a result, even when tactile pavings or acoustic signals are not installed at the pedestrian crossing, the visually impaired person can cross the pedestrian crossing with the guidance of the information processing device without deviation.

SUMMARY

However, in the technique described in WO 2018/025531, it is necessary to capture an image of the direction of crossing from a position in front of the pedestrian crossing in advance and register the image, in order to receive the guidance. Therefore, it is necessary to register many images in accordance with the travel route to the destination, which imposes a heavy burden on the user.

In consideration of the above facts, an object of the present disclosure is to provide an information processing device and an information processing method that can support a target person crossing a pedestrian crossing and that can be easily used by the target person.

An information processing device according to at least one embodiment of the present disclosure includes: a calculation unit that calculates an occupancy rate of a pedestrian crossing in an image obtained by capturing an image of a traveling direction of a target person; a crossing status determination unit that determines a crossing status of the target person for the pedestrian crossing based on the calculated occupancy rate; and a support information generation unit that generates support information for supporting the target person crossing the pedestrian crossing based on the crossing status of the target person.

In the information processing device according to at least one embodiment of the present disclosure, the calculation unit calculates the occupancy rate of the pedestrian crossing in the image obtained by capturing an image of the traveling direction of the target person. The captured image of the traveling direction of the target person is an image close to the view ahead of the target person. Thus, the crossing status determination unit determines the crossing status of the target person for the pedestrian crossing based on the occupancy rate. The support information generation unit generates the support information for supporting the target person crossing the pedestrian crossing based on the crossing status of the target person that is determined by the crossing status determination unit. In this way, the information processing device can determine the crossing status of the target person based on the captured image of the traveling direction and support the target person crossing the pedestrian crossing. Further, since a configuration is adopted in which the crossing status is determined based on only the image captured when the target person crosses the pedestrian crossing, the target person can easily use the information processing device.

In the information processing device according to at least one embodiment of the present disclosure, when the occupancy rate is smaller than a predetermined threshold value, the crossing status determination unit determines that there is a possibility that the target person deviates from the pedestrian crossing.

In the information processing device according to at least one embodiment of the present disclosure, when the occupancy rate of the pedestrian crossing in the captured image is smaller than the predetermined threshold value, that is, when the presence of the pedestrian crossing in the view ahead of the target person is small, it can be seen that the target person is located at a position deviated from the pedestrian crossing. Therefore, when the occupancy rate is smaller than a predetermined threshold value, the crossing status determination unit determines that there is a possibility that the target person deviates from the pedestrian crossing.

In the information processing device according to at least one embodiment of the present disclosure, the occupancy rate is an occupancy rate of the pedestrian crossing in a lateral direction of the image, and the calculation unit calculates the occupancy rate based on a ratio of a lateral dimension of a pedestrian crossing strip to a lateral dimension of the image.

In the information processing device according to at least one embodiment of the present disclosure, the occupancy rate of the pedestrian crossing in the lateral direction of the image is calculated based on the lateral dimension of the image and the lateral dimension of the pedestrian crossing strip in the image. Thus, the lateral positional deviation of the target person with respect to the pedestrian crossing can be estimated with the occupancy rate.

In the information processing device according to at least one embodiment of the present disclosure, for a first pedestrian crossing strip located at a bottom of the image and a second pedestrian crossing strip located adjacent to and above the first pedestrian crossing strip, the calculation unit calculates a traveling direction appropriateness rate based on a ratio of a lateral dimension of the second pedestrian crossing strip to a lateral dimension of the first pedestrian crossing strip, and when the traveling direction appropriateness rate is smaller than a predetermined threshold value, the crossing status determination unit determines that there is a possibility that the target person deviates from the pedestrian crossing.

In the information processing device according to at least one embodiment of the present disclosure, the traveling direction appropriateness rate is calculated based the lateral dimensions of the first pedestrian crossing strip located at the bottom of the image and the second pedestrian crossing strip located adjacent to and above the first pedestrian crossing strip. The pedestrian crossing strips are arranged in parallel with each other. Therefore, when the target person is traveling straightforward on the pedestrian crossing, that is, when the traveling direction is appropriate, the difference between the lateral dimensions of the first pedestrian crossing strip and the second pedestrian crossing strip becomes a small value. Therefore, the traveling direction appropriateness rate approaches 1. When the target person is traveling in a direction that is greatly inclined with respect to the straightforward direction of the pedestrian crossing, the lateral dimension of the second pedestrian crossing strip on the upper side in the image becomes smaller relative to the lateral dimension of the first pedestrian crossing strip, so the traveling direction appropriateness rate decreases. Thus, when the traveling direction appropriateness rate is smaller than a predetermined threshold value, the crossing status determination unit determines that there is a possibility that the target person deviates from the pedestrian crossing.

In the information processing device according to at least one embodiment of the present disclosure, for a first pedestrian crossing strip located at a bottom of the image, the calculation unit obtains a height dimension in a vertical direction from a lower end of the image to the first pedestrian crossing strip, and the calculation unit calculates a starting point distance securing rate based on a ratio of the height dimension of the first pedestrian crossing strip to a vertical dimension of the image, and when the starting point distance securing rate is equal to or larger than a predetermined threshold value, the crossing status determination unit determines that the target person is located at a point in front of the pedestrian crossing.

In the information processing device according to at least one embodiment of the present disclosure, the starting point distance securing rate is calculated based on the vertical dimension of the image and the height dimension of the first pedestrian crossing strip. The first pedestrian crossing strip located at the bottom of the image indicates the starting point of the pedestrian crossing ahead of the target person in the traveling direction. Therefore, the relative positional relationship between the starting point of the pedestrian crossing and the target person can be estimated with the starting point distance securing rate. Further, as the target person approaches the starting point of the pedestrian crossing, the starting point distance securing rate decreases. Thus, when the starting point distance securing rate is equal to or larger than a predetermined threshold value, the crossing status determination unit determines that the target person is located at the point in front of the pedestrian crossing.

In the information processing device according to at least one embodiment of the present disclosure, for a first pedestrian crossing strip located at a bottom of the image and a second pedestrian crossing strip located adjacent to and above the first pedestrian crossing strip, the calculation unit obtains a height dimension in a vertical direction from a lower end of the image to each of the first pedestrian crossing strip and the second pedestrian crossing strip, and calculates a pedestrian crossing entrance rate based on a ratio of the height dimension of the second pedestrian crossing strip to the height dimension of the first pedestrian crossing strip, and when the pedestrian crossing entrance rate is smaller than a predetermined threshold value, the crossing status determination unit determines that the target person is located at a point in front of the pedestrian crossing.

In the information processing device according to at least one embodiment of the present disclosure, the pedestrian crossing entrance rate is calculated based on the height dimensions of the first pedestrian crossing strip and the second pedestrian crossing strip in the image. That is, as the target person approaches the first pedestrian crossing strip, the height dimension of the first pedestrian crossing strip in the image becomes smaller relative to the height dimension of the second pedestrian crossing strip, so the pedestrian crossing entrance rate increases. Thus, when the pedestrian crossing entrance rate is smaller than the predetermined threshold value, the crossing status determination unit determines that the target person is located at the point in front of the pedestrian crossing.

In the information processing device according to at least one embodiment of the present disclosure, the calculation unit inputs a captured image to a learned model to estimate a shape of a pedestrian crossing strip of the pedestrian crossing, the learned model being generated using an image of a pedestrian crossing that does not include a pedestrian and an image of a pedestrian crossing that includes a pedestrian as training data, and calculates an occupancy rate of the pedestrian crossing in the captured image based on the estimated shape of the pedestrian crossing strip.

In the information processing device according to at least one embodiment of the present disclosure, the calculation unit inputs the captured image to the learned model, so as to be able to accurately estimate the shape of the pedestrian crossing strip and calculate the occupancy rate even when the image includes another pedestrian using the pedestrian crossing. Thus, even when there are other pedestrians around the target person, the pedestrian crossing can be accurately recognized and the support information can be provided.

The information processing device according to at least one embodiment of the present disclosure further includes a signal detection unit. The signal detection unit detects a signal state of a traffic light installed at the pedestrian crossing based on the image, and the support information generation unit generates the support information based on the signal state.

In the information processing device according to at least one embodiment of the present disclosure, it is possible to detect the signal state of the traffic light and support the travel of the target person. Thus, when the target person crosses the pedestrian crossing at which the traffic light is installed, it is possible to provide more safety-conscious support information.

The information processing device according to at least one embodiment of the present disclosure further includes an obstacle detection unit. The obstacle detection unit detects an obstacle approaching in a direction of crossing the pedestrian crossing based on a captured image, and the support information generation unit generates the support information when an obstacle is recognized.

In the information processing device according to at least one embodiment of the present disclosure, it is possible to support the target person by detecting an obstacle approaching in the direction of crossing the pedestrian crossing. Thus, even in the pedestrian crossing at which the traffic light is not installed, the support information can be provided so as to allow the safe crossing of the target person.

In the information processing device according to at least one embodiment of the present disclosure, the information processing device is provided on a white cane, and further includes an imaging unit that captures an image, and an output unit that outputs the support information.

In the present disclosure according to at least one embodiment, the information processing device is provided on the white cane, and the information processing device includes the imaging unit that captures an image and the output unit that outputs the support information. Thus, when the target person is a visually impaired person, the support information can be provided using the white cane carried by the target person.

An information processing method according to at least one embodiment of the present disclosure includes: calculating an occupancy rate of a pedestrian crossing in an image obtained by capturing an image of a traveling direction of a target person; determining a crossing status of the target person for the pedestrian crossing based on the calculated occupancy rate; and generating support information for supporting the target person crossing the pedestrian crossing based on the crossing status of the target person.

In the information processing method according to at least one embodiment of the present disclosure, it is possible to support the target person crossing the pedestrian crossing and to provide an information processing device that can be easily used by the target personas, as described above.

As described above, with the information processing device and the information processing method according to the present disclosure, it is possible to support a target person crossing a pedestrian crossing and provide an information processing device that can be easily used by the target person.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an information processing device 10 according to the present embodiment will be described with reference to FIGS. 1 to 11. In the present embodiment, a configuration in which the information processing device 10 is applied to a white cane 1 used by a visually impaired person will be described as an example.

Figure 1:
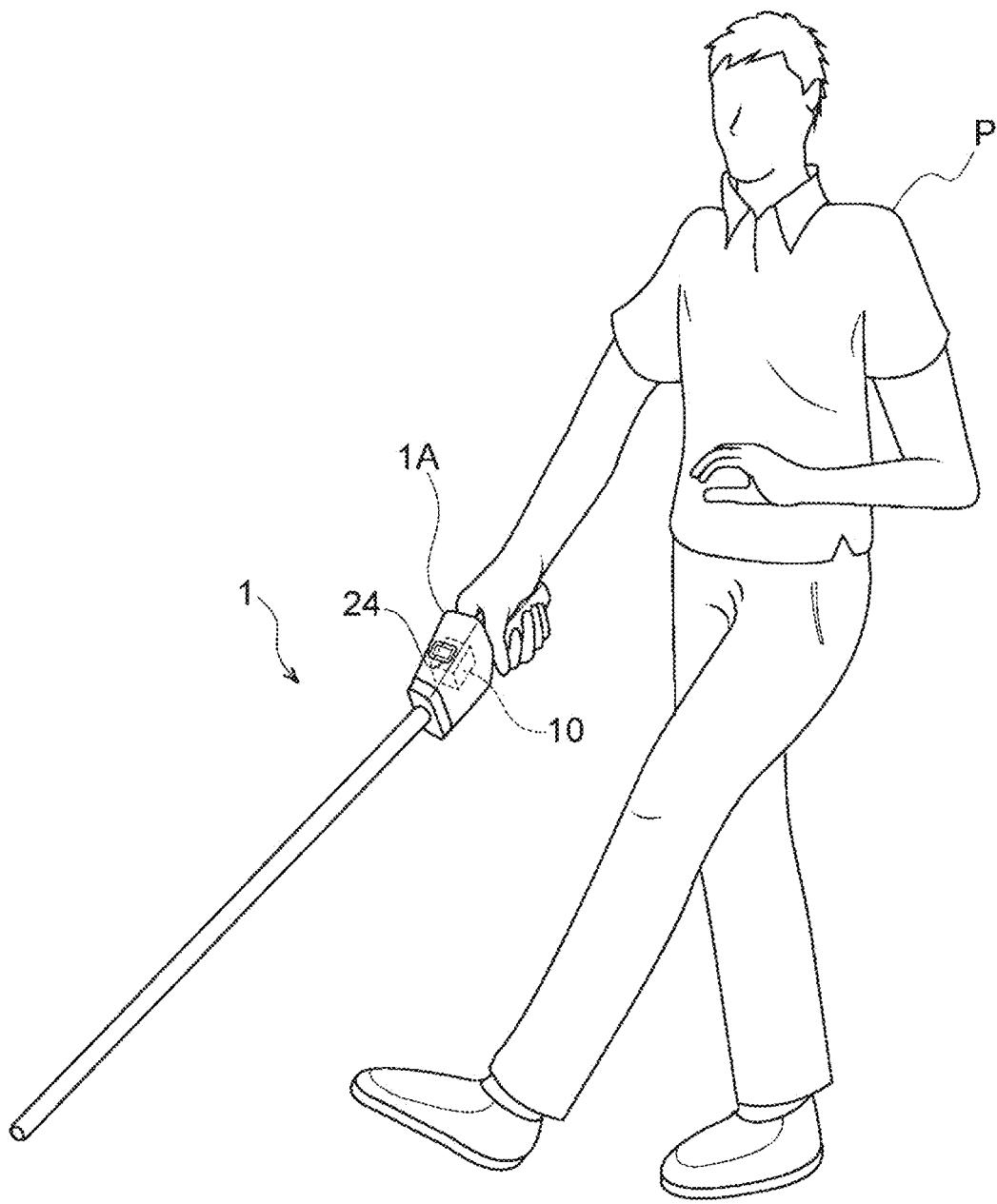
FIG. 1 is a diagram showing an example of use of an information processing device according to an embodiment by a visually impaired person when the information processing device is provided on a white cane.

As shown in FIG. 1, the information processing device 10 provides a target person P carrying the information processing device 10 with support information for safely crossing a pedestrian crossing. In the present embodiment, as an example, the information processing device 10 is applied to the white cane 1 used by a visually impaired person, and provides various kinds of support information when the target person P who is visually impaired crosses a pedestrian crossing.

Hardware Configuration of Information Processing Device 10

Figure 2:
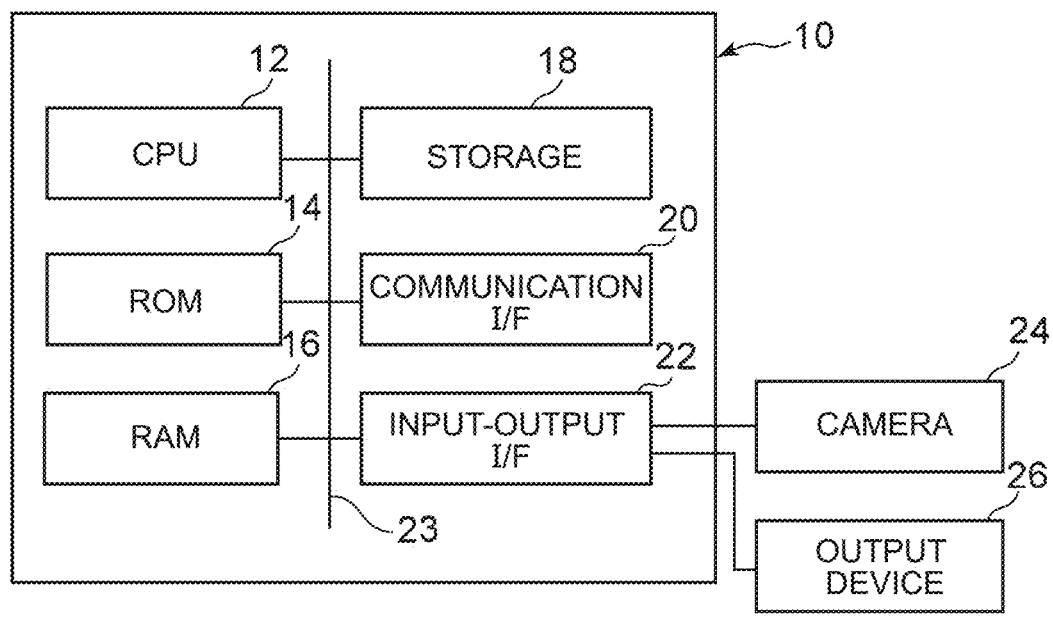
FIG. 2 is a block diagram showing a hardware configuration of the information processing device according to the embodiment.

FIG. 2 is a block diagram showing a hardware configuration of the information processing device 10. As shown in FIG. 2, the information processing device 10 includes a central processing unit (CPU: processor) 12, a read-only memory (ROM) 14, a random access memory (RAM) 16, a storage 18, a communication interface 20, and an input-output interface 22. The components above are connected via a bus (for which reference characters are omitted) so as to be able to communicate with each other.

The CPU 12 is a central arithmetic processing unit that executes various programs and controls various units. That is, the CPU 12 reads the program from the ROM 14 or the storage 18, and executes the program using the RAM 16 as a work area. The CPU 12 controls the above components and performs various arithmetic processes in accordance with the programs stored in the ROM 14 or the storage 18.

The ROM 14 stores various programs and various data. The RAM 16 temporarily stores a program or data as a work area. The storage 18 is composed of a hard disk drive (HDD) or a solid state drive (SSD), and stores various programs including an operating system, and various data. In the present embodiment, the ROM 14 or the storage 18 stores a program for performing a silencing process, a learned model M (see FIG. 4), and the like.

The communication interface 20 is an interface for the information processing device 10 to communicate with a server and other devices (not shown), and standards such as Ethernet (registered trademark), long-term evolution (LTE), fiber-distributed data interface (FDDI), and Wi-Fi (registered trademark) are used therefor.

A camera 24 and an output device 26 are connected to the input-output interface 22. The camera 24 is disposed, for example, in a grip portion 1A that is held by the target person P in the white cane 1. The camera 24 is directed forward of the target person P, and captures an image of the traveling direction of the target person P. The output device 26 includes, for example, at least one of a speaker and a vibrator. In addition to this, an operation unit (not shown) capable of starting and stopping the camera 24 is connected to the input-output interface 22. Further, a GPS device, a gyro sensor, a light detection and ranging (Lidar), and the like may be connected to the input-output interface 22 as needed.

Functional Configuration of Information Processing Device 10

The information processing device 10 realizes various functions using hardware resources mentioned above. The functional configuration realized by the information processing device 10 will be described with reference to FIG. 3.

Figure 3:
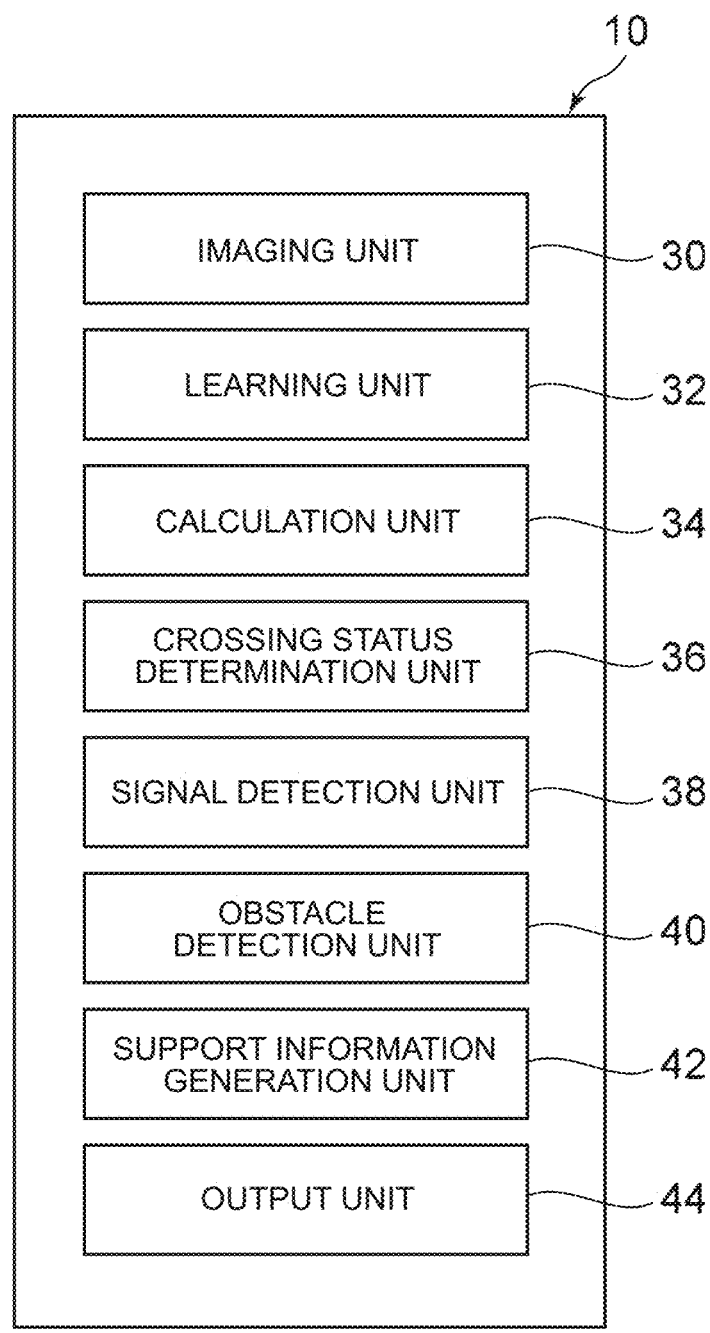
FIG. 3 is a block diagram showing a functional configuration of the information processing device according to the embodiment.

As shown in FIG. 3, the information processing device 10 includes an imaging unit 30, a learning unit 32, a calculation unit 34, a crossing status determination unit 36, a signal detection unit 38, an obstacle detection unit 40, a support information generation unit 42, and an output unit 44 as functional configurations. Each functional configuration is realized as the CPU 12 serving as a control unit reads and executes the program stored in the ROM 14 or the storage 18.

The imaging unit 30 has a function of capturing an image of the traveling direction of the target person P with the camera 24 when the camera 24 is activated through the operation of the operation unit by the target person P.

Figure 4:
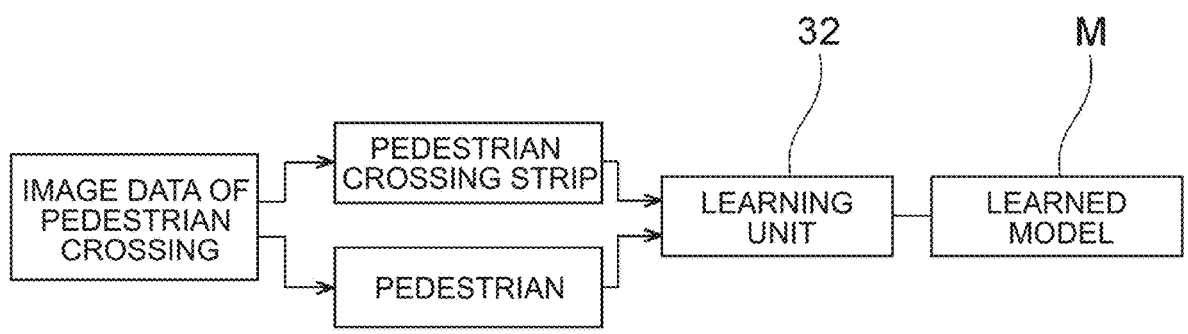
FIG. 4 is a block diagram illustrating a learning phase according to the embodiment.

As shown in FIG. 4, the learning unit 32 generates a learned model M by performing machine learning using typical image data obtained by capturing images of pedestrian crossings as training data. Specifically, the typical image data represents images of pedestrian crossings that do not include pedestrians and images of pedestrian crossings that include pedestrians. Images showing pedestrian crossings and pedestrians are acquired from the typical image data, and machine learning is performed by the learning unit 32 using the image data of pedestrian crossing strips and pedestrians as teacher data. Thereby, the learning unit 32 generates the learned model M in which parameters of the feature points having the highest image recognition rate (object detection rate) from the viewpoint of recognizing pedestrian crossing strips and the viewpoint of recognizing pedestrians are stored for each class. The class means a category of an object recognized with image recognition. To the learned model M, for example, a deep neural network is applied. As an example, a long short term memory (LSTM) that is a kind of recursive neural network (RNN) is applied to the learned model M of the present embodiment.

The calculation unit 34 estimates the shapes of the pedestrian crossing strips of the pedestrian crossing by inputting the image captured by the imaging unit 30 to the learned model M generated by the learning unit 32. Specifically, the calculation unit 34 performs object detection by inputting the captured image to the learned model M. The calculation unit 34 classifies the class of the object based on the feature points of the object that are acquired from the image input to the learned model, and detects that the object is a pedestrian crossing strip or a pedestrian.

In addition, the calculation unit 34 performs a recognition process of recognizing an area of the detected object. Then, the calculation unit 34 generates a bounding box represented by a rectangular box, for an approximate area where the object is located in the image. The approximate area where the object is located is, for example, an area of a size necessary to enclose the object. The bounding box indicates an area larger than the area where the object is actually located in the detection of an object such as a person having an outer shape containing a curved line. However, in the detection of the object having a rectangular outer shape like the pedestrian crossing strip, the area enclosed by the bounding box substantially coincides with the outer shape of the object. Therefore, in the calculation of an occupancy rate and the like ($R_1$ to $R_4$) described later, dimensional errors with respect to the actual pedestrian crossing strips can be made small.

Figure 5A:
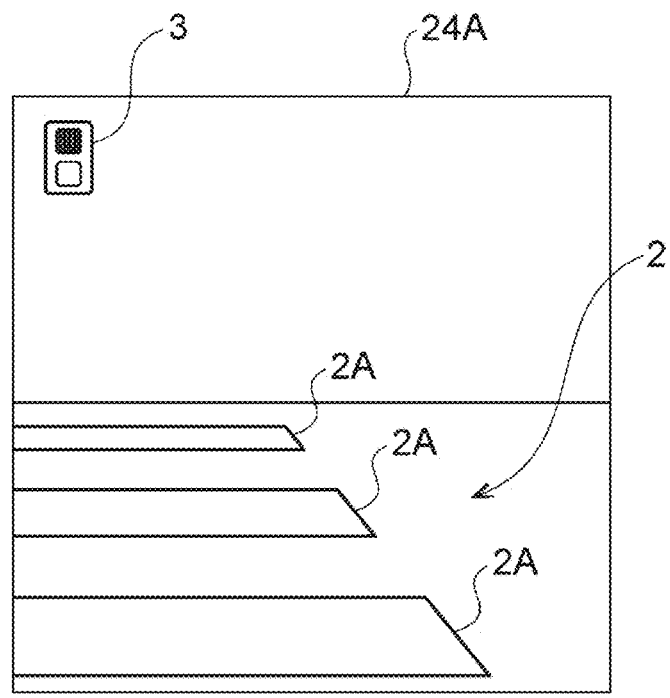
FIG. 5A is a diagram showing an example of an image obtained by capturing an image of a traveling direction of a target person.
Figure 5B:
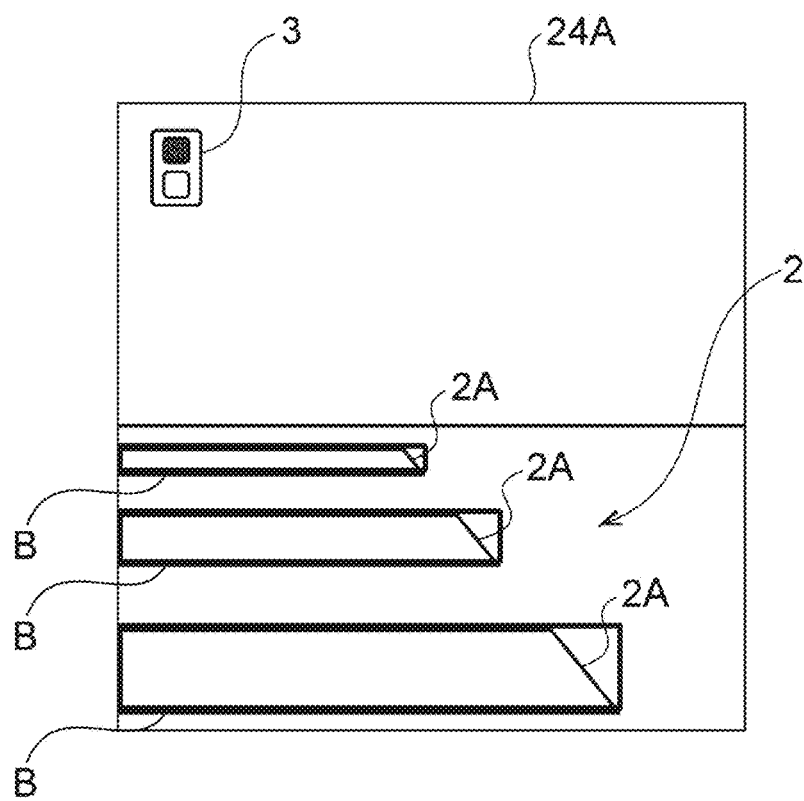
FIG. 5B is an example showing shapes of pedestrian crossing strips in an image that are estimated by a calculation unit.

For example, FIG. 5A shows an image 24A captured by the camera 24 of the white cane 1 from a position in front of the pedestrian crossing. The image 24A includes a pedestrian crossing 2 on the front side in the traveling direction and a traffic light 3 installed at the pedestrian crossing 2. The pedestrian crossing 2 includes a plurality of pedestrian crossing strips 2A extending in the width direction of the pedestrian crossing 2, and the pedestrian crossing strips 2A are arranged at predetermined intervals along a straightforward direction of the pedestrian crossing 2 so as to be parallel to each other. When the image 24A shown in FIG. 5A is input to the learned model M, bounding boxes B indicating the areas of the pedestrian crossing strips 2A are generated as shown in FIG. 5B.

The calculation unit 34 also calculates the occupancy rate $R_1$, a traveling direction appropriateness rate $R_2$, a starting point distance securing rate $R_3$, and a pedestrian crossing entrance rate $R_4$, based on the sizes of the generated bounding boxes B. Definition of each rate will be described in order.

The occupancy rate $R_1$ is an occupancy rate of the pedestrian crossing 2 with respect to the image 24A in the lateral direction, and is a value serving as an index indicating the size that the pedestrian crossing occupies in the image 24A assuming a view ahead of the target person P. For the occupancy rate $R_1$ of the present embodiment, the occupancy rate of the pedestrian crossing with respect to the image in the lateral direction is calculated. The relative positional relationship between the target person P and the pedestrian crossing 2 in the lateral direction can be determined based on the magnitude of the occupancy rate $R_1$. As shown in the following equation (1), the occupancy rate $R_1$ is represented by the ratio of the lateral dimension $W_x$ of the pedestrian crossing strip 2A to the lateral dimension $W_{img}$ of the image 24A.

Equation 1

$$R_1 = W_x / W_{img} \quad (1)$$

Figure 6:
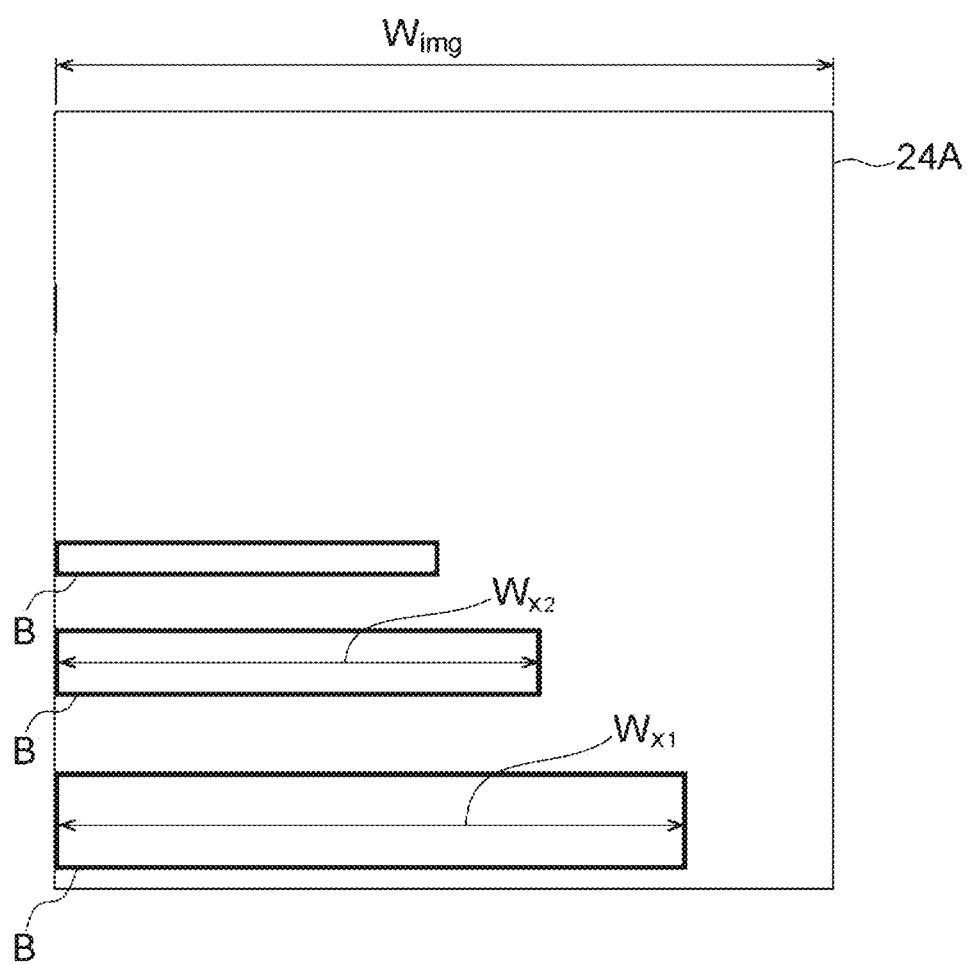
FIG. 6 is a diagram illustrating a lateral dimension of the image and lateral dimensions of the pedestrian crossing strips.

As shown in FIG. 6, the lateral dimension $W_{img}$ of the image 24A is the width dimension of the image 24A. The lateral dimension of the pedestrian crossing strip 2A is the lateral dimension $W_{x1}$ of the bounding box B. From the viewpoint of making the image 24A closer to the view ahead of the target person P that would be seen if the target person P recognizes using his/her vision, the lateral dimension $W_{x1}$ may be used to calculate the occupancy rate $R_1$ based on the bounding box B of the pedestrian crossing strip 2A located at the bottom of the image 24A that is closest to the target person P. The occupancy rate $R_1$ may be a value obtained by correcting the value of the above equation (1) with a correction value corresponding to the physique and walking speed of the target person P.

Figure 8A:
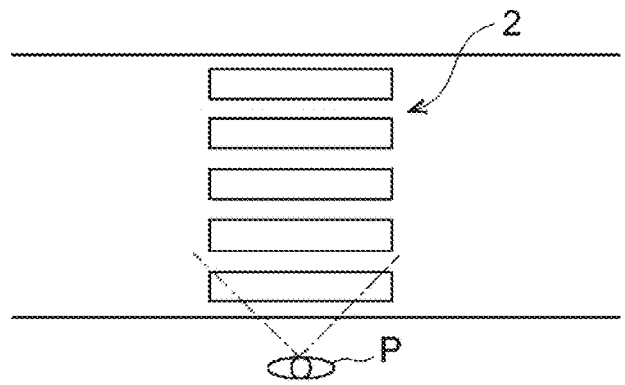
FIG. 8A is a schematic plan view schematically showing a position of the target person and the traveling direction of the target person with respect to the pedestrian crossing.
Figure 8B:
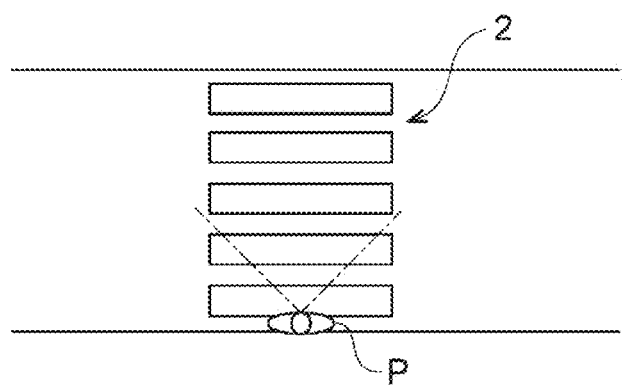
FIG. 8B is a schematic plan view schematically showing the position of the target person and the traveling direction of the target person with respect to the pedestrian crossing.
Figure 8C:
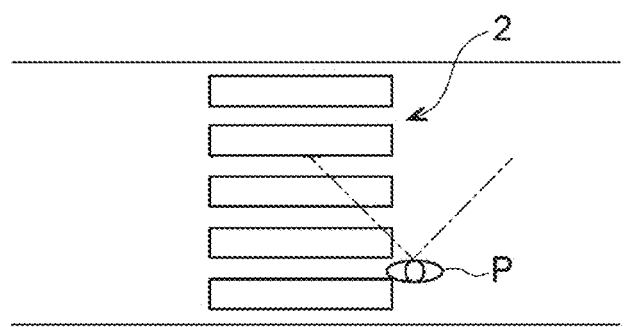
FIG. 8C is a schematic plan view schematically showing the position of the target person and the traveling direction of the target person with respect to the pedestrian crossing.

As shown in FIGS. 8A and 8B, when the target person P captures an image of the traveling direction from the center position of the pedestrian crossing 2 in the width direction, the lateral dimension $W_{x1}$ of the pedestrian crossing strip 2A approaches the lateral dimension $W_{img}$ of the image 24A. Therefore, the occupancy rate $R_1$ of the equation (1) approaches 1. On the other hand, as shown in FIG. 8C, when the target person P captures an image of the traveling direction from the position deviating to the right from the center of the pedestrian crossing 2, the lateral dimension $W_{x1}$ of the pedestrian crossing strip 2A becomes smaller relative to the lateral dimension $W_{img}$ of the image 24A, so the occupancy rate $R_1$ accordingly decreases.

The traveling direction appropriateness rate $R_2$ is an index indicating the degree of inclination of the traveling direction of the target person P with respect to the straightforward direction of the pedestrian crossing 2. As shown in the following equation (2), for the pedestrian crossing strip 2A located at the bottom of the image and the pedestrian crossing strip 2A located adjacent to and above the pedestrian crossing strip 2A at the bottom, the traveling direction appropriateness rate $R_2$ is represented by the ratio of the lateral dimension $W_{x(i+1)}$ of the upper pedestrian crossing strip 2A to the lateral dimension $W_{xi}$ of the pedestrian crossing strip 2A at the bottom.

Equation 2

$$R_2 = W_{x(i+1)}/W_{xi} \quad (2)$$

As shown in FIG. 6, the lateral dimension $W_{x2}$ of the pedestrian crossing strip 2A located adjacent to and above the pedestrian crossing strip 2A at the bottom of the image 24A is a lateral dimension of the corresponding bounding box B. The traveling direction appropriateness rate $R_2$ may be a value obtained by correcting the value of the above equation (2) with a correction value corresponding to the physique and walking speed of the target person P.

Figure 8D:
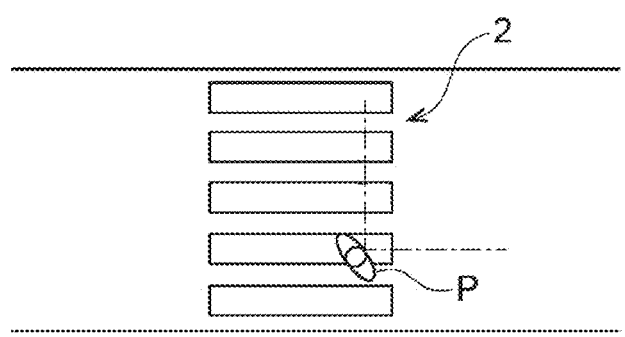
FIG. 8D is a schematic plan view schematically showing the position of the target person and the traveling direction of the target person with respect to the pedestrian crossing.

As shown in FIGS. 8A and 8B, when the target person P is traveling along the straightforward direction of the pedestrian crossing 2 from the center position of the pedestrian crossing 2 in the width direction, a difference between the lateral dimensions $W_{x1}$, $W_{x2}$ of the adjacent pedestrian crossing strips 2A is small. Therefore, the traveling direction appropriateness rate $R_2$ approaches 1. On the other hand, as shown in FIG. 8D, when the target person P is facing in a direction that is greatly inclined to the right with respect to the straightforward direction inside the pedestrian crossing 2, the lateral dimension $W_{x2}$ of the pedestrian crossing strip 2A located adjacent to and above the pedestrian crossing strip 2A at the bottom becomes smaller relative to the lateral dimension $W_{x1}$ of the pedestrian crossing strip at the bottom. Therefore, the traveling direction appropriateness rate $R_2$ decreases. That is, it can be seen that as the traveling direction appropriateness rate $R_2$ decreases, the amount of inclination of the traveling direction of the target person P with respect to the straightforward direction of the pedestrian crossing 2 increases. Thus, in such a case, it can be determined that the target person P is likely to deviate from the pedestrian crossing if the target person P continues to travel in this direction.

The starting point distance securing rate $R_3$ is an index indicating the distance between the starting point of the pedestrian crossing 2 and the target person P. The starting point of the pedestrian crossing 2 is a position of the pedestrian crossing strip 2A that is closest to the target person P when viewed from the position in front of the pedestrian crossing 2. As shown in the following equation (3), the starting point distance securing rate $R_3$ is represented by the ratio of a height dimension $H_x$ of the pedestrian crossing strip 2A to the vertical dimension $H_{img}$ of the image 24A.

Equation 3

$$R_3 = H_x/H_{img} \quad (3)$$

Figure 7:
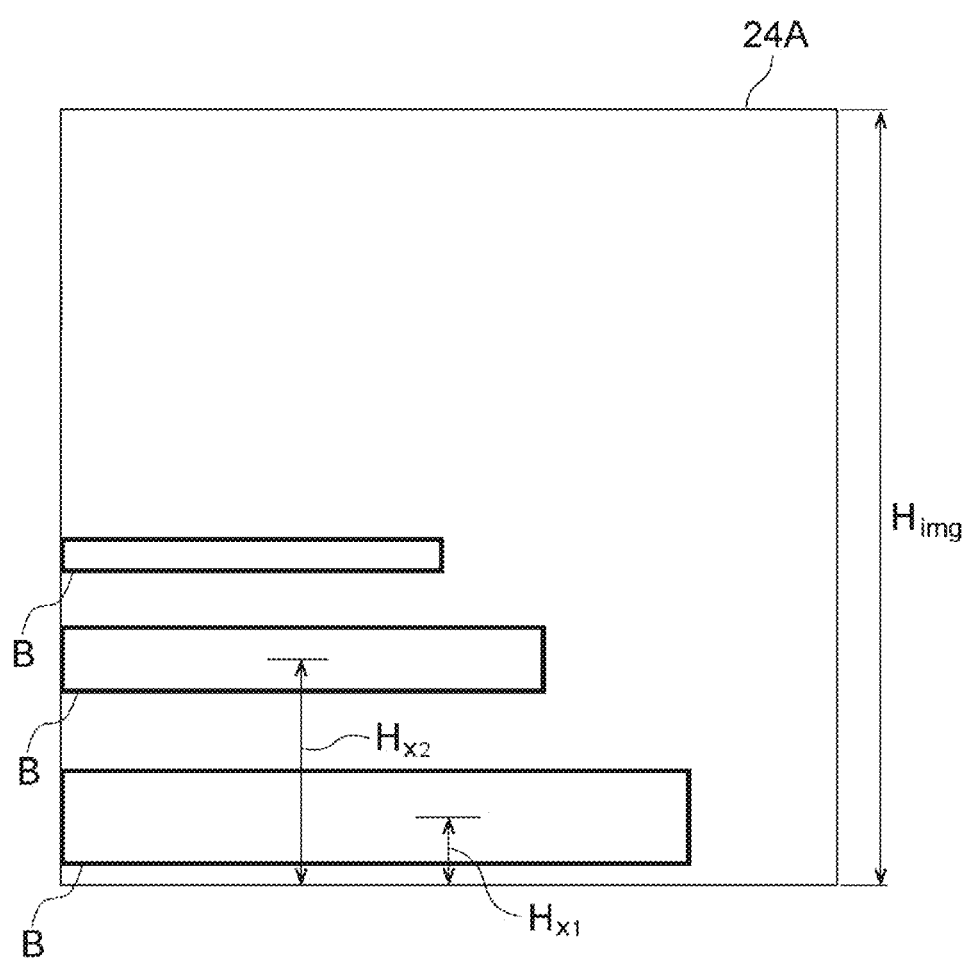
FIG. 7 is a diagram illustrating a vertical dimension of the image and height dimensions of the pedestrian crossing strips.

As shown in FIG. 7, the vertical dimension $H_{img}$ of the image 24A is the dimension of the image 24A in the up-down direction. The height dimension of the pedestrian crossing strip 2A is the height dimension $H_{x1}$ in the vertical direction from the lower end of the image 24A to the centerline of the pedestrian crossing strip 2A. From the viewpoint of making the image 24A closer to the view ahead of the target person P that would be seen if the target person P recognizes using his/her vision, the height dimension $H_{x1}$ may be used to calculate the starting point distance securing rate $R_3$ based on the bounding box B of the pedestrian crossing strip 2A located at the bottom of the image 24A that is closest to the target person P. The starting point distance securing rate $R_3$ may be a value obtained by correcting the value of the above equation (3) with a correction value corresponding to the physique and walking speed of the target person P.

As shown in FIG. 8A, when the target person P travels from a standing position in front of the pedestrian crossing 2 with a predetermined distance secured from the starting point, to a position within the pedestrian crossing 2 in FIG. 8B, the height dimension $H_{x1}$ of the pedestrian crossing strip 2A at the bottom of the image 24A becomes smaller relative to the vertical dimension $H_{img}$ of the image 24A as the target person P approaches the starting point. Therefore, the starting point distance securing rate $R_3$ decreases.

The pedestrian crossing entrance rate $R_4$ is an index indicating the degree of entrance of the target person P into the pedestrian crossing 2. As shown in the following equation (4), the pedestrian crossing entrance rate $R_4$ is represented by the ratio of the height dimension $H_{x(i+1)}$ of the pedestrian crossing strip 2A that is located adjacent to and above the pedestrian crossing strip 2A at the bottom of the image 24A to the height dimension $H_{xi}$ of the pedestrian crossing strip 2A at the bottom.

Equation 4

$$R_4 = H_{x(i+1)}/H_{xi} \quad (4)$$

As shown in FIG. 7, the height dimension $H_{x2}$ of the pedestrian crossing strip 2A located adjacent to and above the pedestrian crossing strip 2A at the bottom of the image 24A is the height dimension $H_{x2}$ in the vertical direction from the lower end of the image 24A to the centerline of the corresponding bounding box B. The pedestrian crossing entrance rate $R_4$ may be a value obtained by correcting the value of the above equation (4) with a correction value corresponding to the physique and walking speed of the target person P.

As shown in FIG. 8A, when the target person P travels from a standing position in front of the pedestrian crossing 2 with a predetermined distance secured from the starting point, to a position within the pedestrian crossing 2 in FIG. 8B, the height dimension $H_{x1}$ of the pedestrian crossing strip 2A at the bottom of the image 24A becomes smaller relative to the height dimension $H_{x2}$ of the pedestrian crossing strip 2A located adjacent to and above the pedestrian crossing strip 2A at the bottom. Therefore, as the target person P approaches the starting point, the pedestrian crossing entrance rate $R_4$ increases.

The crossing status determination unit 36 determines the crossing status of the target person for the pedestrian crossing, based on the occupancy rate $R_1$, the traveling direction appropriateness rate $R_2$, the starting point distance securing rate $R_3$, and the pedestrian crossing entrance rate $R_4$ calculated by the calculation unit 34. Specifically, the crossing status determination unit 36 determines a status as to whether the target person P can deviate to the outside of the pedestrian crossing 2. The crossing status determination unit 36 also determines the status as to whether the safety is ensured at the position in front of the pedestrian crossing 2 before the target person P crosses the pedestrian crossing 2.

When the traffic light 3 is installed at the pedestrian crossing 2, the signal detection unit 38 detects a signal state of the traffic light 3 based on the image 24A captured by the camera 24. The signal state is, for example, a crossable state (green light) that allows crossing of the pedestrian crossing 2 and a non-crossable state (red light) that does not allow crossing of the pedestrian crossing 2.

When the traffic light 3 is not installed at the pedestrian crossing 2, the obstacle detection unit 40 detects an obstacle approaching in the direction of crossing the pedestrian crossing 2 based on the image 24A captured by the camera 24.

The support information generation unit 42 generates the support information for supporting the target person crossing the pedestrian crossing based on various crossing statuses determined by the crossing status determination unit 36, the detection result of the signal detection unit 38, and the detection result of the obstacle detection unit.

The output unit 44 outputs various kinds of support information generated by the support information generation unit 42 with the output device 26 to notify the target person P. Specifically, the output unit 44 may notify by operating the vibrator at the timing when the various kinds of information are generated. In this case, the vibration pattern of the vibrator may be changed in accordance with the output information. Further, the output unit 44 may output an audio signal or a message from the speaker to notify the target person P of the various kinds of information.

Operations

Next, operations of the present embodiment will be described.

Support Process

An example of the support process for providing the support information to the target person P will be described using the flowchart shown in FIG. 9. The support process is executed as the CPU 12 reads a support program from the ROM 14 or the storage 18, deploys the program to the RAM 16, and executes the program.

Figure 9:
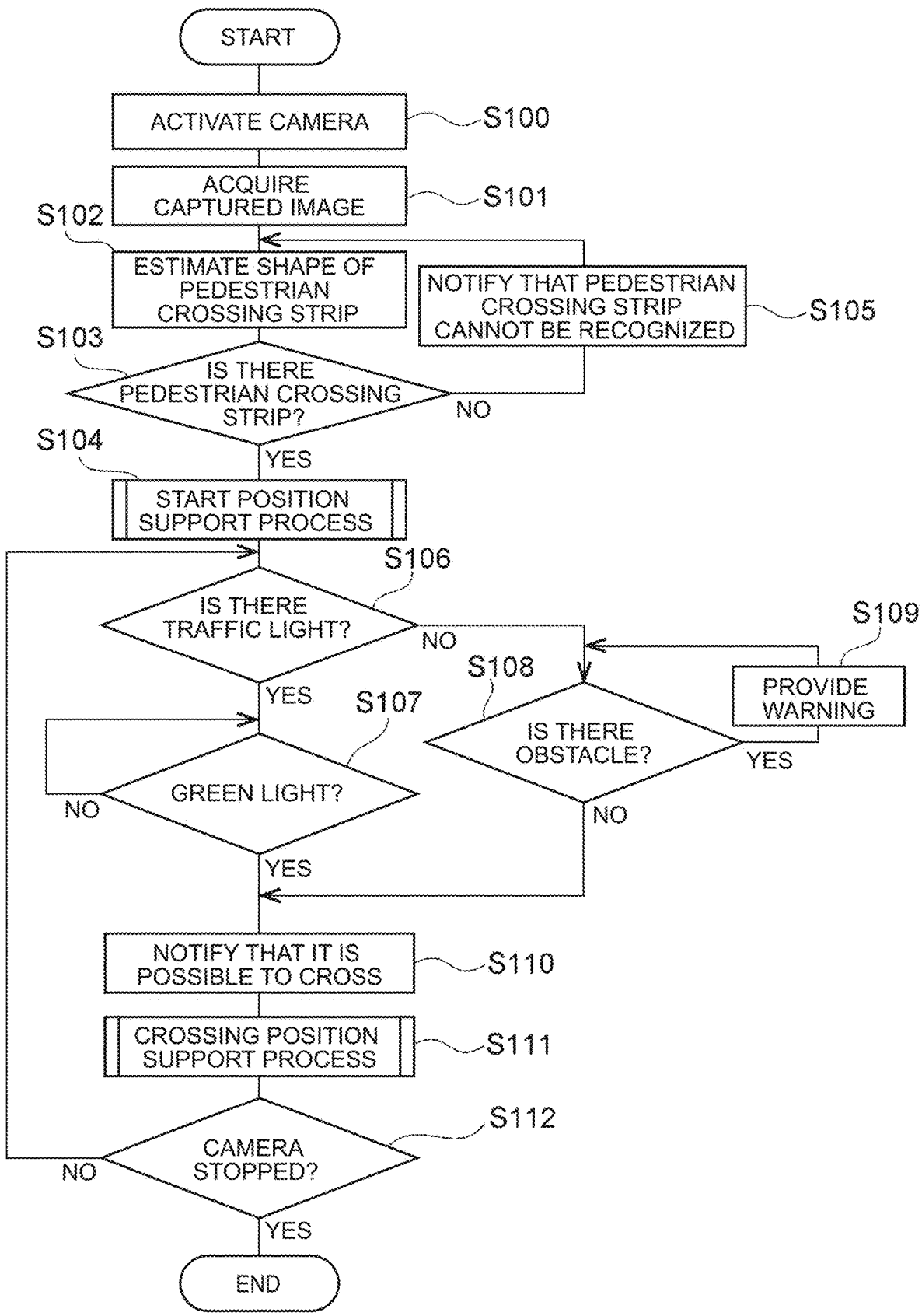
FIG. 9 is a flowchart showing an example of a flow of a support process in the embodiment.

As shown in FIG. 9, the CPU 12 activates the camera 24 in step S100. The camera 24 is activated by operating the operation unit at the timing when it is determined that the target person P has reached the vicinity of the pedestrian crossing 2.

Next, the CPU 12 acquires a captured image in step S101. Specifically, the CPU 12 acquires, with the function of the imaging unit 30, the image 24A of the traveling direction of the target person P that is captured by the camera 24.

The CPU 12 estimates the shape of the pedestrian crossing strip 2A included in the image 24A in step S102. Specifically, the CPU 12 generates the bounding box B corresponding to the area of the pedestrian crossing strip 2A with the function of the calculation unit 34, and estimates the shape of the pedestrian crossing strip 2A. The learned model M is used to generate the bounding box B at this time.

The CPU 12 determines in step S103 whether there is the shape of the pedestrian crossing strip 2A. When the CPU 12 determines that there is a pedestrian crossing strip, the CPU 12 proceeds to step S104 and executes the start position support process. The start position support process can provide support for causing the target person P to travel to a safe position such that the target person P does not enter the pedestrian crossing before crossing the pedestrian crossing.

On the other hand, for example, when the pedestrian crossing 2 is congested and thus the pedestrian crossing strip is not detected even with the learned model M, or when the captured image 24A is an image that does not include the pedestrian crossing, the CPU 12 determines that there is no pedestrian crossing strip, and proceeds to step S105. In step S105, the CPU 12 generates the support information indicating that the pedestrian crossing strip cannot be recognized with the function of the support information generation unit 42, and notifies the target person P of the support information with the function of the output unit 44. When the CPU 12 determines that there is no pedestrian crossing strip because the pedestrian crossing is congested, the support information may be notified as a voice message "The pedestrian crossing is congested". Alternatively, the support information may be notified as a voice message "Please stop" or the like. When the CPU 12 completes the process of step S105, the CPU 12 returns to step S102.

Subsequently, the CPU 12 determines in step S106 whether there is a traffic light. Specifically, the CPU 12 determines presence or absence of a traffic light from the image 24A captured with the function of the signal detection unit 38. When the CPU 12 determines that there is a traffic light, the CPU 12 proceeds to step S107, and determines whether the signal state of the traffic light is a green light.

When the CPU 12 determines in step S107 that the traffic light is a green light, the CPU 12 proceeds to step S110. When the CPU 12 determines in step S107 that the traffic light is a red light, the CPU 12 repeats the process of step S107.

On the other hand, when the CPU 12 determines in step S106 that there is no traffic light, the CPU 12 proceeds to step S108, and determines whether there is an obstacle. Specifically, the CPU 12 analyzes the image 24A with the function of the obstacle detection unit 40, and determines presence or absence of an obstacle approaching in the direction of crossing the pedestrian crossing 2. When the CPU 12 determines in step S108 that there is an obstacle, the CPU 12 proceeds to step S109, and provides a warning to the target person P. Specifically, the CPU 12 generates the support information for notifying that there is an obstacle with the function of the support information generation unit 42, and notifies the target person P of the support information with the function of the output unit 44. Thereby, it is possible to suppress a collision between the target person P and an obstacle. When the CPU 12 completes the process of step S109, the CPU 12 returns to step S108.

On the other hand, when the CPU 12 determines in step S108 that there is no obstacle, the CPU 12 proceeds to step S110.

The CPU 12 notifies the target person of the fact that it is possible to cross the pedestrian crossing 2 in step S110. Specifically, the CPU 12 generates support information for prompting for crossing of the pedestrian crossing with the function of the support information generation unit 42, and outputs the support information from the output device 26 with the function of the output unit 44.

The CPU 12 executes a crossing position support process in step S111. Through the crossing position support process, it is possible to provide support information for supporting the target person P not to deviate from the pedestrian crossing when crossing the pedestrian crossing.

Subsequently, the CPU 12 determines whether the camera 24 has stopped in step S112. The camera 24 is stopped by operating the operation unit of the white cane 1 at the timing when it is determined that the target person P has crossed the pedestrian crossing. When the CPU 12 determines that the camera 24 has stopped, the CPU 12 ends the process. When the CPU 12 determines that the camera 24 has not stopped, the CPU 12 returns to step S106 and repeats the process.

Start Position Support Process

Figure 10:
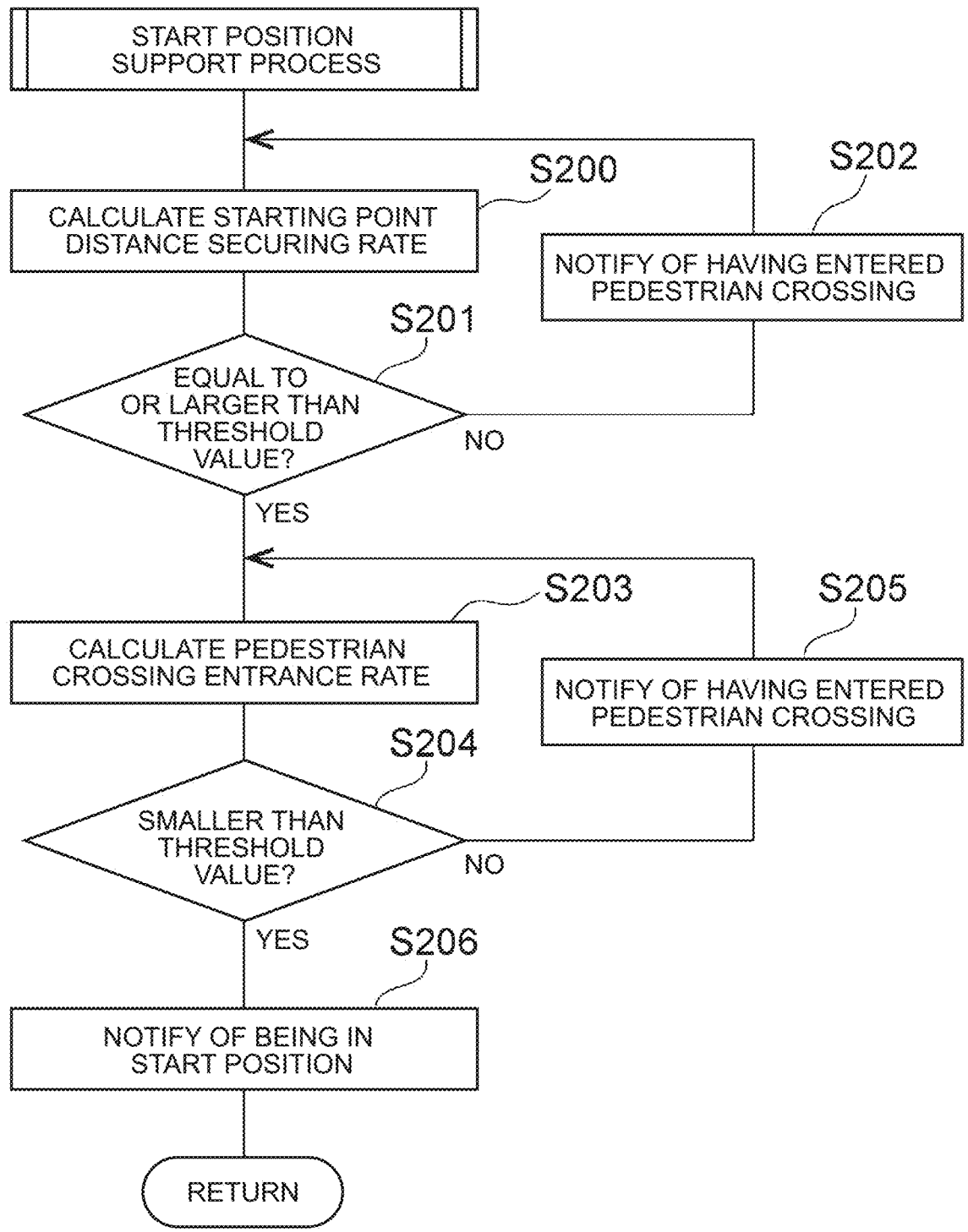
FIG. 10 is a flowchart showing an example of a flow of a start position support process in the embodiment.

Next, the start position support process will be described with reference to FIG. 10. This process is executed, for example, when the shape of the pedestrian crossing strip 2A is estimated by the calculation unit 34.

The CPU 12 calculates the starting point distance securing rate $R_3$ in step S200. After that, the CPU 12 proceeds to step S201 and determines whether the starting point distance securing rate $R_3$ is equal to or larger than a predetermined threshold value. When the CPU 12 determines that the starting point distance securing rate $R_3$ is equal to or larger than the predetermined threshold value, the CPU 12 determines that the target person P is in a safe position in front of the pedestrian crossing, and proceeds to step S203. When the CPU 12 determines that the starting point distance securing rate $R_3$ is smaller than the predetermined threshold value, the CPU 12 determines that the target person P has entered the pedestrian crossing or will soon enter the pedestrian crossing, and proceeds to step S202.

The CPU 12 notifies that the target person P has entered the pedestrian crossing in step S202. Specifically, the CPU 12 generates the corresponding support information with the function of the support information generation unit 42, and outputs the support information with the function of the output unit 44. The support information may be provided by directly indicating the direction in which the target person P should travel with a voice message. When the CPU 12 completes the process of step S202, the CPU 12 returns to step S200.

The CPU 12 calculates the pedestrian crossing entrance rate $R_4$ in step S203. After that, the CPU 12 proceeds to step S204 and determines whether the pedestrian crossing entrance rate $R_4$ is smaller than a predetermined threshold value. When the CPU 12 determines that the pedestrian crossing entrance rate $R_4$ is smaller than the predetermined threshold value, the CPU 12 determines that the target person P is in a safe position in front of the pedestrian crossing, and proceeds to step S206.

When the CPU 12 determines in step S104 that the pedestrian crossing entrance rate $R_4$ is equal to or larger than the predetermined threshold value, the CPU 12 determines that the target person P has entered the pedestrian crossing or will soon enter the pedestrian crossing, and proceeds to step S205. The CPU 12 notifies that the target person P has entered the pedestrian crossing in step S205. Specifically, the CPU 12 generates the corresponding support information with the function of the support information generation unit 42, and outputs the support information with the function of the output unit 44. The support information may be provided by directly indicating the direction in which the target person P should travel with a voice message. When the CPU 12 completes the process of step S205, the CPU 12 returns to step S203.

In step S206, the CPU 12 provides the support information indicating that the target person P is in an appropriate start position (standby position), and returns to the step of the support process.

Crossing Position Support Process

Figure 11:
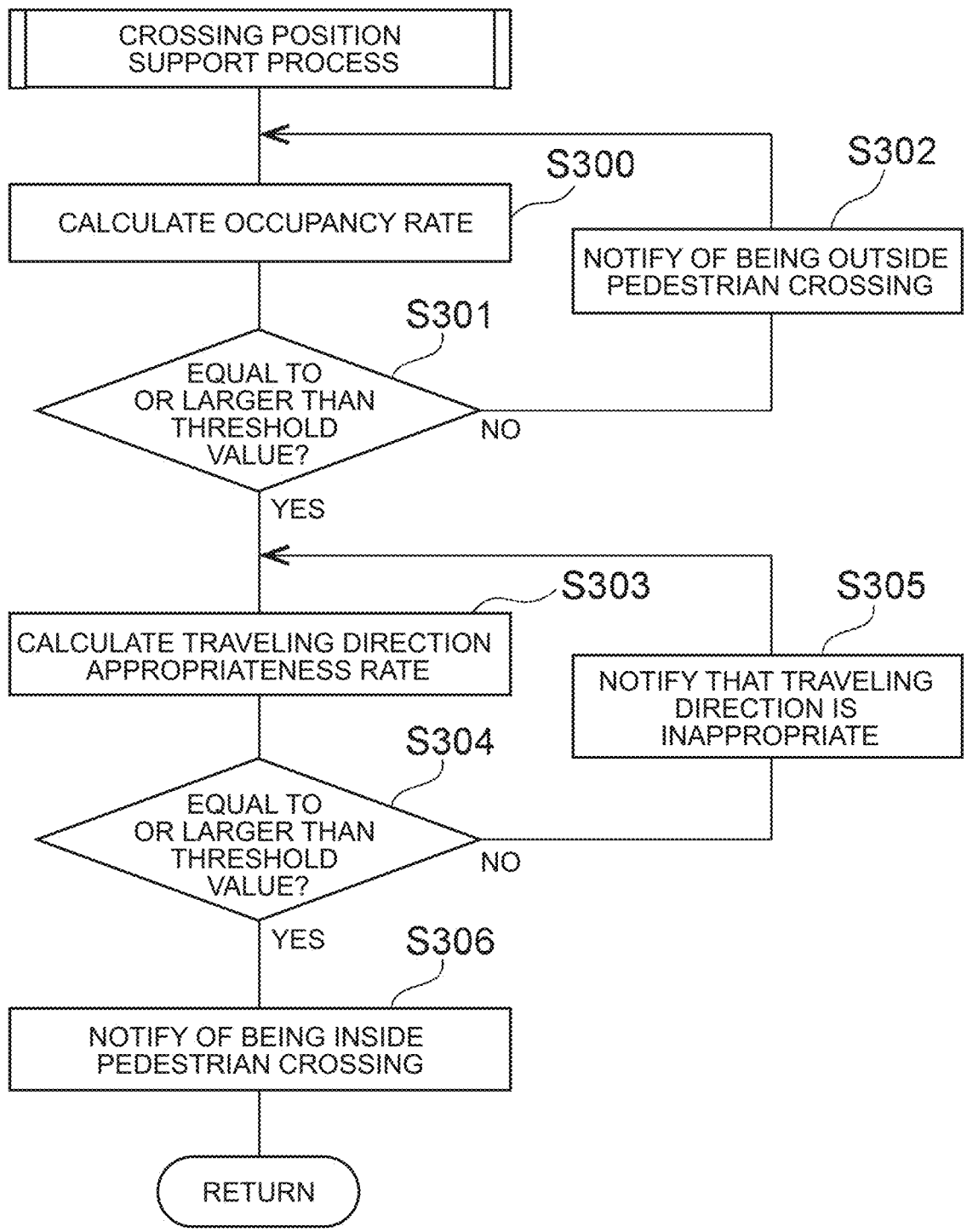
FIG. 11 is a flowchart showing an example of a flow of a crossing position support process in the embodiment.

Next, the crossing position support process will be described with reference to FIG. 11. This process is executed, for example, when the output unit 44 notifies that the target person P can cross.

The CPU 12 calculates the occupancy rate $R_1$ in step S300, and determines in step S301 whether the occupancy rate $R_1$ is equal to or larger than the predetermined threshold value. When the occupancy rate $R_1$ is smaller than the predetermined threshold value, the CPU 12 determines that the position of the target person P is deviated in the lateral direction with respect to the pedestrian crossing 2, so the target person P is likely to deviate from the pedestrian crossing 2 if the target person P continues to travel in this direction (see the position in FIG. 8C). In this case, the CPU 12 proceeds to step S302 and provides support information indicating that the target person P is outside the pedestrian crossing. When the CPU 12 completes the process of step S302, the CPU 12 returns to step S300.

When the occupancy rate $R_1$ is equal to or larger than the predetermined threshold value, the CPU 12 determines that the position of the target person P is inside the pedestrian crossing, and proceeds to step S303.

The CPU 12 calculates the traveling direction appropriateness rate $R_2$ in step S303, and determines in step S304 whether the traveling direction appropriateness rate $R_2$ is equal to or larger than the predetermined threshold value. As described above, when the traveling direction appropriateness rate $R_2$ is smaller than the predetermined threshold value, it can be seen that the traveling direction of the target person P is greatly inclined with respect to the straightforward direction of the pedestrian crossing 2 (see the traveling direction in FIG. 8D). Thus, the CPU 12 determines that the target person P is likely to deviate from the pedestrian crossing 2 if the target person P continues to travel in this direction with the function of the crossing status determination unit 36. Then, when the CPU 12 determines that the traveling direction appropriateness rate $R_2$ is smaller than the predetermined threshold value, the CPU 12 proceeds to step S305 and provides the support information indicating that the traveling direction is inappropriate. The support information may be provided by directly indicating the direction to which the target person P should turn with a voice message. When the CPU 12 completes the process of step S305, the CPU 12 returns to step S303.

When the CPU 12 determines that the traveling direction appropriateness rate $R_2$ is equal to or larger than the predetermined threshold value, the CPU 12 provides, in step S306, the support information indicating that the target person P is inside the pedestrian crossing and ends the process.

As described above, in the information processing device 10 of the present embodiment, the calculation unit 34 calculates the occupancy rate $R_1$ of the pedestrian crossing 2 in the image 24A. The captured image 24A of the traveling direction of the target person P is an image close to the view ahead of the target person P. Therefore, the crossing status determination unit 36 can determine the crossing status of the target person P for the pedestrian crossing 2 based on the occupancy rate $R_1$. The support information generation unit 42 generates the support information for supporting the target person P crossing the pedestrian crossing 2 based on the crossing status of the target person P. In this way, the information processing device 10 can determine the crossing status of the target person P based on the captured image 24A of the traveling direction and support the target person P crossing the pedestrian crossing 2. Further, since a configuration is adopted in which the crossing status is determined based on only the image captured when the target person P crosses the pedestrian crossing, the target person P can easily use the information processing device 10.

Specifically, when the occupancy rate $R_1$ of the pedestrian crossing 2 in the captured image 24A is smaller than the predetermined threshold value, that is, when the presence of the pedestrian crossing 2 in the view ahead of the target person P is small, it can be seen that the target person P is located at a position deviated from the pedestrian crossing. Thus, when the occupancy rate $R_1$ is smaller than the predetermined threshold value, the crossing status determination unit 36 of the information processing device 10 determines that the target person P may deviate from the pedestrian crossing 2.

Further, in the present embodiment, as shown in the equation (1), the occupancy rate $R_1$ of the pedestrian crossing 2 in the lateral direction of the image 24A is calculated based on the lateral dimension $W_{img}$ of the image 24A and the lateral dimension $W_x$ of the pedestrian crossing strip 2A in the image 24A. Thus, the lateral positional deviation of the target person P with respect to the pedestrian crossing 2 can be effectively estimated with the occupancy rate $R_1$.

Further, in the present embodiment, the traveling direction appropriateness rate $R_2$ is calculated based on the lateral dimensions $W_{xi}$, $W_{x(i+1)}$ of the pedestrian crossing strip 2A at the bottom of the image 24A and the pedestrian crossing strip 2A located adjacent to and above the pedestrian crossing strip 2A at the bottom.

The pedestrian crossing strips 2A are arranged in parallel with each other. Therefore, when the target person P is traveling straightforward on the pedestrian crossing 2, that is, when the traveling direction is appropriate, the difference between the lateral dimensions of the pedestrian crossing strip 2A at the bottom and the pedestrian crossing strip 2A located adjacent to and above the pedestrian crossing strip 2A at the bottom becomes a small value. Thus, the traveling direction appropriateness rate $R_2$ approaches 1. When the target person P is traveling in a direction that is greatly inclined with respect to the straightforward direction of the pedestrian crossing 2, the lateral dimension $W_{x2}$ of the pedestrian crossing strip 2A on the upper side in the image in FIG. 6 becomes smaller relative to the lateral dimension $W_{x1}$ of the pedestrian crossing strip 2A at the bottom, so the traveling direction appropriateness rate $R_2$ decreases. Thus, when the traveling direction appropriateness rate $R_2$ is smaller than the predetermined threshold value, the crossing status determination unit 36 can determine that the target person P may deviate from the pedestrian crossing 2.

Further, in the present embodiment, the starting point distance securing rate $R_3$ of the equation (3) is calculated based on the vertical dimension $H_{img}$ of the image shown in FIG. 7 and the height dimension $H_{x1}$ of the pedestrian crossing strip 2A at the bottom. The pedestrian crossing strip 2A located at the bottom of the image indicates the starting point of the pedestrian crossing 2 ahead of the target person P in the traveling direction. Thus, the relative positional relationship between the starting point of the pedestrian crossing 2 and the target person P can be estimated with the starting point distance securing rate $R_3$. Further, as the target person P approaches the starting point of the pedestrian crossing 2, the starting point distance securing rate $R_3$ decreases. Thus, when the starting point distance securing rate $R_3$ is equal to or larger than the predetermined threshold value, the crossing status determination unit 36 can determine that the target person P is located at a point in front of the pedestrian crossing 2.

Further, in the present embodiment, the pedestrian crossing entrance rate $R_4$ is calculated based on the height dimensions $H_{x1}$, $H_{x2}$ of the pedestrian crossing strip 2A at the bottom of the image 24A and the pedestrian crossing strip 2A located adjacent to and above the pedestrian crossing strip 2A at the bottom shown in FIG. 7. That is, as the target person P approaches the pedestrian crossing strip 2A at the bottom, the height dimension $H_{x1}$ of the pedestrian crossing strip 2A at the bottom becomes smaller relative to the height dimension $H_{x2}$ of the pedestrian crossing strip 2A located adjacent to and above the pedestrian crossing strip 2A at the bottom. Therefore, the pedestrian crossing entrance rate $R_4$ becomes high. Thus, when the pedestrian crossing entrance rate $R_4$ is smaller than the predetermined threshold value, the crossing status determination unit 36 can determine that the target person P is located at a point in front of the pedestrian crossing 2.

Further, in the present embodiment, the calculation unit 34 inputs the captured image 24A to the learned model M, so as to be able to accurately estimate the shape of the pedestrian crossing strip 2A and calculate the occupancy rate $R_1$ even when the image 24A includes another pedestrian using the pedestrian crossing 2. Thus, even when there are other pedestrians around the target person, the pedestrian crossing 2 can be accurately recognized and the support information can be provided.

Further, in the present embodiment, it is possible to support the travel of the target person P by detecting the signal state of the traffic light 3. Thus, when the target person P crosses the pedestrian crossing 2 at which the traffic light 3 is installed, it is possible to provide more safety-conscious support information.

Further, in the present embodiment, it is possible to support the target person P by detecting an obstacle approaching in the direction of crossing the pedestrian crossing 2. Thus, even in the pedestrian crossing 2 at which the traffic light is not installed, the support information can be provided so as to allow the safe crossing of the target person P.

Further, in the present embodiment, the information processing device 10 is provided on the white cane 1, and the information processing device 10 includes the imaging unit 30 for capturing the image 24A and the output unit 44 for outputting the support information. Thus, when the target person P is a visually impaired person, the support information can be provided using the white cane 1 that is carried on a daily basis, which can improve the convenience.

Supplementary Description

The information processing device 10 and the information processing method executed by the information processing device 10 according to the present embodiment have been described above. It goes without saying that the present disclosure can be implemented in various modes without departing from the scope of the present disclosure. For example, the information processing device 10 is provided on the white cane 1 in the above embodiment, but the present disclosure is not limited to this. All or part of the information processing device may be composed of another device such as a smartphone that can be carried by the target person.

For example, the output device 26 is provided on the white cane 1 in the above embodiment, but the present disclosure is not limited to this. The output device 26 may be provided in a device such as a smartphone or earphones that can be carried by the target person P. In this case, the device equipped with an output device such as a smartphone may receive output signals from the output unit of the white cane 1 by short-range wireless communication such as Bluetooth (registered trademark) and output as a sound or vibration pattern.

Further, the target person for support is a visually impaired person in the above embodiment, but the present disclosure is not limited to this. For example, the support information for crossing a pedestrian crossing may be provided for elderly people who have difficulty in turning their bodies quickly in a predetermined direction for visual checking or people with physical disabilities who act in wheelchairs.

In the above embodiment, the camera 24 is activated through the operation of the operation unit by the target person P and the information processing device does not have map data that requires a GPS device or a large-scale storage device so that the entire device is simplified and downsized. However, the present disclosure is not limited to this. For example, a configuration may be adopted in which the current position of the target person is acquired by a GPS device and the camera 24 is automatically activated when it is detected that the target person is in the vicinity of a pedestrian crossing with reference to the map data based on the current position. Alternatively, a configuration may be adopted in which the information processing device can communicate with an external device such as a smartphone, the current position of the target person P (current position of the information processing device) is acquired based on the GPS function and the map data reference function of the smartphone or the like, and the camera 24 is activated when it is detected that the current position is in the vicinity of the pedestrian crossing.

Further, in the above embodiment, the occupancy rate in the image in the lateral direction is calculated based on the lateral dimension of the captured image and the lateral dimension of the pedestrian crossing strip 2A. However, the present disclosure is not limited to this. For example, the occupancy rate of area of the pedestrian crossing with respect to the image may be defined as the occupancy rate of the pedestrian crossing in the present disclosure, based on the area of the captured image and the total area of the captured pedestrian crossing strips.

Further, various processors other than the CPU 12 may execute the support process, the start position support process, and the crossing position support process that are executed as the CPU 12 reads the software (program) in the above embodiment. Examples of the processor in this case include a programmable logic device (PLD) of which circuit configuration can be changed after being manufactured, such as a field-programmable gate array (FPGA), and a dedicated electric circuit that is a processor including a circuit configuration that has been exclusively designed for executing a specific process, such as an application specific integrated circuit (ASIC). In addition, the support process, the start position support process, and the crossing position support process may be executed by one of these various processors, or a combination of two or more processors of the same type or different types (for example, a combination of FPGAs and a combination of a CPU and an FPGA, and the like). Further, the hardware configuration of the various processors is, more specifically, an electric circuit in which circuit elements such as semiconductor devices are combined.

Further, in the above embodiment, the storage 18 is configured to store various data. However, the disclosure is not limited to this. For example, a recording medium such as a compact disk (CD), a digital versatile disk (DVD), or a universal serial bus (USB) memory may be used as a storage unit. In this case, various programs, data, and the like are stored in the recording medium mentioned above.

What is claimed is:

1. An information processing device on a cane, comprising:
   a camera in a grip portion of the cane;
   a calculation unit that calculates an occupancy rate of a pedestrian crossing in an image obtained by capturing an image of a traveling direction of a target person with the camera;
   a crossing status determination unit that determines a crossing status of the target person for the pedestrian crossing based on the calculated occupancy rate; and
   a support information generation unit that generates support information for supporting the target person crossing the pedestrian crossing based on the crossing status of the target person.

2. The information processing device according to claim 1, wherein when the occupancy rate is smaller than a predetermined threshold value, the crossing status determination unit determines that there is a possibility that the target person deviates from the pedestrian crossing.

3. The information processing device according to claim 1, wherein:
   the occupancy rate is an occupancy rate of the pedestrian crossing in a lateral direction of the image; and
   the calculation unit calculates the occupancy rate based on a ratio of a lateral dimension of a pedestrian crossing strip to a lateral dimension of the image.

4. The information processing device according to claim 1, wherein:
   for a first pedestrian crossing strip located at a bottom of the image and a second pedestrian crossing strip located adjacent to and above the first pedestrian crossing strip, the calculation unit calculates a traveling direction appropriateness rate based on a ratio of a lateral dimension of the second pedestrian crossing strip to a lateral dimension of the first pedestrian crossing strip; and
   when the traveling direction appropriateness rate is smaller than a predetermined threshold value, the crossing status determination unit determines that there is a possibility that the target person deviates from the pedestrian crossing.

5. The information processing device according to claim 1, wherein:
   for a first pedestrian crossing strip located at a bottom of the image, the calculation unit obtains a height dimension in a vertical direction from a lower end of the image to the first pedestrian crossing strip, and the calculation unit calculates a starting point distance securing rate based on a ratio of the height dimension of the first pedestrian crossing strip to a vertical dimension of the image; and when the starting point distance securing rate is equal to or larger than a predetermined threshold value, the crossing status determination unit determines that the target person is located at a point in front of the pedestrian crossing.

6. The information processing device according to claim 1, wherein:

for a first pedestrian crossing strip located at a bottom of the image and a second pedestrian crossing strip located adjacent to and above the first pedestrian crossing strip, the calculation unit obtains a height dimension in a vertical direction from a lower end of the image to each of the first pedestrian crossing strip and the second pedestrian crossing strip, and calculates a pedestrian crossing entrance rate based on a ratio of the height dimension of the second pedestrian crossing strip to the height dimension of the first pedestrian crossing strip; and when the pedestrian crossing entrance rate is smaller than a predetermined threshold value, the crossing status determination unit determines that the target person is located at a point in front of the pedestrian crossing.

7. The information processing device according to claim 1, wherein the calculation unit inputs a captured image to a learned model to estimate a shape of a pedestrian crossing strip of the pedestrian crossing, the learned model being generated using an image of a pedestrian crossing that does not include a pedestrian and an image of a pedestrian crossing that includes a pedestrian as training data, and calculates an occupancy rate of the pedestrian crossing in the captured image based on the estimated shape of the pedestrian crossing strip.

8. The information processing device according to claim 1, further comprising a signal detection unit, wherein:

the signal detection unit detects a signal state of a traffic light installed at the pedestrian crossing based on the image; and the support information generation unit generates the support information based on the signal state.

9. The information processing device according to claim 1, further comprising an obstacle detection unit, wherein:

the obstacle detection unit detects an obstacle approaching in a direction of crossing the pedestrian crossing based on a captured image; and the support information generation unit generates the support information when an obstacle is recognized.

10. The information processing device according to claim 1, further comprising:

an output unit that outputs the support information.

11. An information processing method, comprising:

calculating, by a calculation unit, an occupancy rate of a pedestrian crossing in an image obtained by capturing, with a camera in a grip portion of a cane, an image of a traveling direction of a target person;

determining, by a crossing status determination unit, a crossing status of the target person for the pedestrian crossing based on the calculated occupancy rate; and generating, by a support information generation unit, support information for supporting the target person crossing the pedestrian crossing based on the crossing status of the target person.

* * * * *